(12) United States Patent
Johler et al.

(10) Patent No.: US 6,989,759 B2
(45) Date of Patent: Jan. 24, 2006

(54) LIGHTING SYSTEM

(75) Inventors: Günther Johler, Bregenz (AT);
Siegried Luger, Dornbirn (AT);
Bernhard Klocker, Dornbirn (AT)

(73) Assignee: Zumtobel Staff GmbH, Dornbirn (AT)

( * ) Notice: Subject to any disclaimer, the term of this patent is extended or adjusted under 35 U.S.C. 154(b) by 142 days.

(21) Appl. No.: 10/216,718

(22) Filed: Aug. 13, 2002

(65) Prior Publication Data
US 2003/0048626 A1 Mar. 13, 2003

Related U.S. Application Data

(63) Continuation of application No. PCT/EP01/00711, filed on Jan. 23, 2001.

(30) Foreign Application Priority Data
Feb. 14, 2000 (DE) ................................ 100 06 408

(51) Int. Cl.
*G08B 13/00* (2006.01)

(52) U.S. Cl. .................. 340/641; 340/635; 340/636.1; 340/664; 362/20; 362/276
(58) Field of Classification Search ................ 340/641, 340/514, 635, 636.1, 652, 664; 362/20, 276
See application file for complete search history.

(56) References Cited

U.S. PATENT DOCUMENTS

| 4,799,039 A | * | 1/1989 | Balcom et al. ............. 340/333 |
| 4,894,601 A | * | 1/1990 | Watkins ....................... 320/134 |
| 5,154,504 A | * | 10/1992 | Helal et al. ................... 362/20 |
| 5,929,781 A | * | 7/1999 | Vosika .................... 340/825.72 |
| 6,339,296 B1 | * | 1/2002 | Goral ......................... 315/86 |

FOREIGN PATENT DOCUMENTS

| DE | 2747173 | 4/1979 |
| DE | 19611161 A1 | 3/1996 |
| EP | 0490329 A1 | 6/1992 |
| EP | 0940904 A2 | 9/1999 |

* cited by examiner

*Primary Examiner*—Julie Bichngoc Lieu
(74) *Attorney, Agent, or Firm*—Fitzpatrick, Cella, Harper & Scinto

(57) ABSTRACT

A lighting system contains at least one controllable first light (NL), which is connected to a first current supply (L, N), and at least one controllable emergency current light (SL), which is connected to a further emergency current supply (P, N), separate from the first current supply (L, N). All lights have respective control devices associated therewith, all control devices being connected to a common bus (D1, D2). A monitoring device (5) issues a monitoring signal corresponding to the condition of the first current supply (L, N) onto the bus (D1, D2), which monitoring signal is evaluated at least by the control device of the emergency current light (SL) for the recognition of a disruption and for activation of an emergency current operation.

6 Claims, 2 Drawing Sheets

LIGHTING SYSTEM

CROSS-REFERENCE TO RELATED APPLICATIONS

This is a Continuation of International Application No. PCT/EP01/00711, filed Jan. 23, 2001, which in turn claims priority of German application DE 100 06 408.6, filed Feb. 14, 2000, the priorities of which are hereby claimed, said International Application having been published in German, but not in English, as WO 01/61823 A1 on Aug. 23, 2001.

BACKGROUND OF THE INVENTION

1. Field of the Invention

The present invention relates to a lighting system in which controllable lights and controllable emergency current lights are connected, respectively, to a first current supply and to an emergency current supply, the lights being controlled by associated control devices. 2. Description of the Related Art For the illumination of extensive premises or buildings there are often employed lighting systems having a plurality of de-centrally installed lights, the lights being controlled by a central control device which controls at least the switching on and switching off, possibly also the dimming, of the individual lights. For safety reasons as a rule there is provided with such lighting systems also an emergency current or emergency lighting operation, in which a few of the lights, or even special emergency lights, are operated at a power which may be reduced.

A lighting system described in DE 27 47 173 A1 contains for example autonomous emergency current supply devices which have their own emergency lamps. The emergency current supply devices contain an emergency current battery and a charging device connected with the mains. In the case of mains failure, the emergency current light is then switched on by means of a switch. A further lighting system having emergency current operation is described in EP 0 490 329 B1. Here, fluorescent lamps are connected with the mains via electronic ballasts. If mains supply is disrupted or fails there is applied to the supply lines for the ballasts a battery d.c. voltage of the level of the mains voltage. The switch-over from the a.c. voltage of the normal mains to the d.c. voltage is automatically recognized by the ballasts. These then continue to generate an a.c. voltage for the operation of the fluorescent lamps but control the lamps in a predetermined emergency lighting mode, in which for example only a few particular lamps are operated at circa 50% of the maximum lamp power.

With the lighting system of EP 0 490 329 B1 just described, the same supply voltage is delivered to all lights, whereby each ballast individually checks for itself whether it is the normal mains voltage or not, and then switches into the emergency lighting mode if a mains disruption is recognized. For reasons of safety, a lighting system is, however, often so configured that only a certain proportion of the lights are provided for emergency current illumination, these lights being connected not to the general current supply but to an emergency current supply separate or independent thereof. This emergency current supply is an additional a.c. voltage supply, preferably independent of the normal current supply, which in the case of a total failure of the mains can be replaced by a d.c. voltage source. In this case, however, the process described in EP 0 490 329 B1 cannot be used, since in accordance with the features just described, the emergency current lights are supplied independently of the normal lights with current so that they or their ballasts or control devices are not in a position to monitor the normal mains voltage for the normal lights. A disruption of the current supply for the normal lights is thus not immediately recognizable for the emergency lights.

In order, despite this, to inform the emergency current lights of a failure or disruption of the normal current supply it has previously been usual to monitor the mains for the normal lights of the lighting system for disruption with a special monitoring device, and upon determination of a fault to temporarily interrupt the emergency current supply. This interruption is maintained for a certain time, so that it is also in effect recognized or interpreted as a control command for the activation of the emergency light operation by the control devices of the emergency current lights. Such a temporary interruption of the emergency current supply is, however, disadvantageous since there is necessary therefor a not inconsiderable technical outlay. If the emergency current lights are gas discharge lamps then further the possibility cannot be excluded that these may first have to be newly preheated or newly started, as a result of which a loss of time until the activation of the emergency lighting must be accepted.

SUMMARY OF THE INVENTION

It is thus the object of the present invention to indicate a lighting system having at least one controllable emergency current light provided for an emergency current operation, whereby there is sent to a control device of this light, upon the occurrence of a disruption to the normal current supply, a corresponding control command, without the emergency current supply thereby being influenced. Further, a reliable activation of the emergency current operation is to be ensured despite a technical outlay which is as small as possible.

This object is achieved by means of a lighting system which comprises a controllable first light, a controllable emergency current light, control devices and a control signal module. The first light and the emergency current light are connected, respectively, to a first current supply and to a separate emergency current supply. The control devices are connected to the lights and to a common signal supply bus. The control signal module is connected to monitor the condition of the first current supply and to generate a corresponding monitoring signal. The control signal module is also connected to the common bus to supply the monitoring signal to the bus for evaluation by at least one of the control devices. At least one control device is constructed to activate the emergency current supply upon evaluation of a current supply disruption from the first current supply.

The invention distinguishes itself in that both the lights provided for normal operation and also the emergency current lights, fed from a separate current supply, each have a control device associated therewith, whereby the control devices are connected to a common bus and by means of a monitoring device a monitoring signal corresponding to the state of the normal current supply is issued onto the bus. This monitoring signal is detected and evaluated by the control devices for the recognition of an emergency situation, whereby an omission, or abnormal reception, of this monitoring signal is interpreted as an emergency situation. The loss of the monitoring signals on the bus thus replaces the previously employed process with a temporary interruption of the current supply for the emergency current lights. In a particularly simple configuration, the monitoring device may thereby simply be connected with the normal current supply, since in this case the agreed monitoring signal is necessarily absent if a disruption occurs. In this way there is thus ensured in the case of a disruption a reliable activation of the emergency current operation.

Further developments of the invention are described and claimed herein. Thus, during the normal operation the bus can also be used for the transmission of control commands which are issued from a central control signal module onto the bus. In this case, the control signal module can at the same time assume the monitoring function and issue the monitoring signal corresponding to the condition of the mains. Thereby it can be determined that the monitoring signal is issued either at temporally regular intervals or permanently. In the first case the transmission of control commands may be effected only in certain periods of time or must—as in the second case—be particularly characterized. This characteristic can consist for example in a certain signal pattern or in that the transmission of the control signals may not exceed a certain period of time. Alternatively to the control signal module there may however be provided a separate monitoring module which monitors the current supply and issues the monitoring signal to the bus.

If a disruption is recognized by the control devices of the emergency current lights, these control the lights into a particular emergency current operation. Thereby, the lights are either only switched on after the recognition of a disruption or—if they were already on—set to a predetermined emergency lighting level. Along with the emergency current lights there may be provided in the lighting system further also additional warning signal devices, which likewise register an absence or an irregularity of the monitoring signal and then issue optical or acoustic warning signals. Finally, the transmission of a message or report to a central monitoring point can also be provided, so that maintenance work can be immediately put in hand.

DETAILED DESCRIPTION OF THE PREFERRED EMBODIMENT

Figure 1:
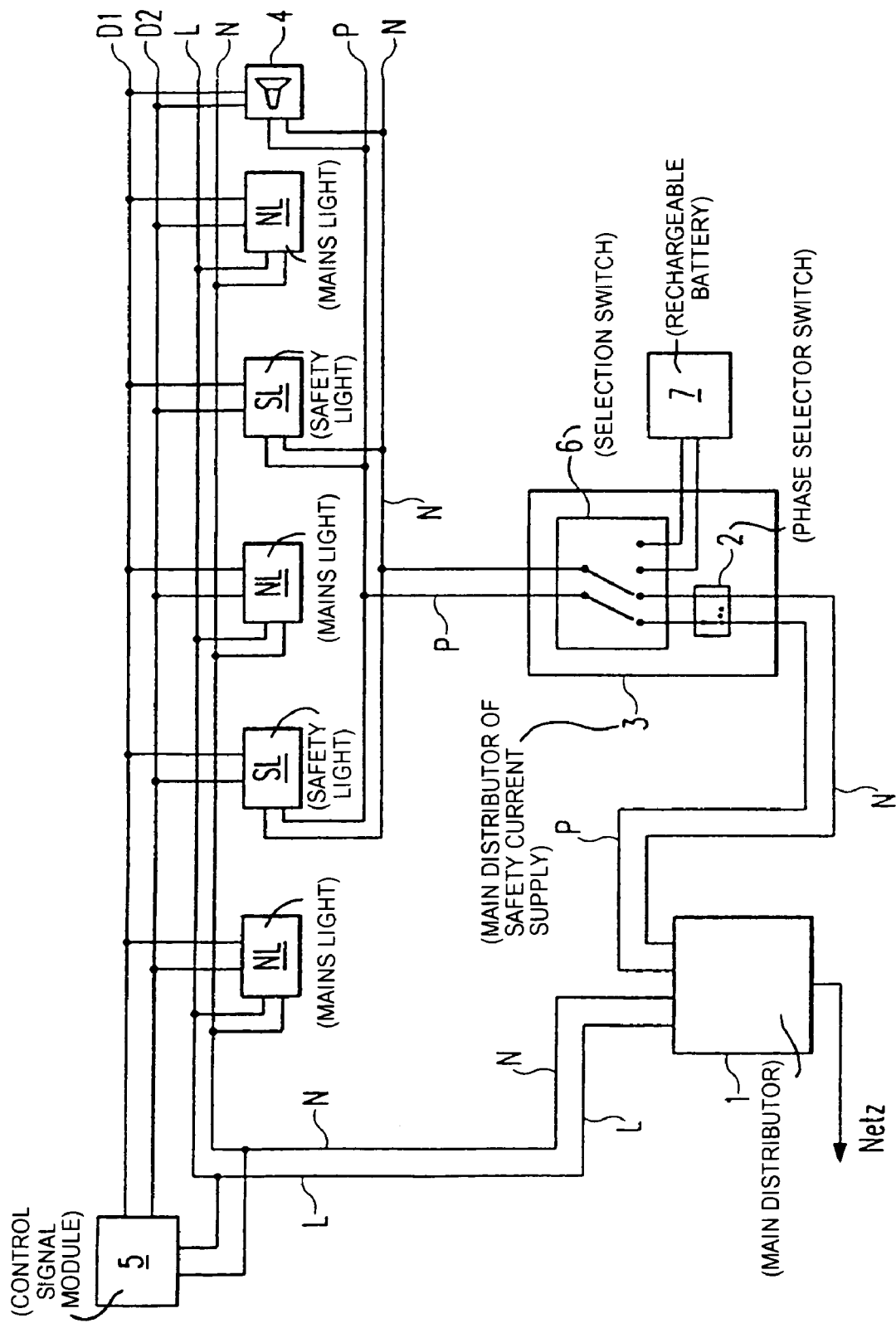
FIG. 1 is a schematic of a lighting system in accordance with the invention.

The lighting system illustrated in FIG. 1 contains a plurality of mains lights NL, which are provided for normal operation, and a plurality of safety or emergency current lights SL. Thereby, different lamp types may be provided for the mains lights NL and for the emergency current lights SL. In particular it would be conceivable that fluorescent lamps more favorable in terms of energy consumption are used for the emergency current lights SL, whilst for the main lights NL a different lamp type, with which possibly a more appealing illumination can be attained, is selected. Basically, however, all lights NL and SL have each a (non-illustrated) control device by means of which they can at least be switched on and switched off, and possibly also be dimmable. Thereby, all lights NL and SL, with their associated control devices, are connected to the two data lines D1 and D2 of a common bus, via which appropriate control commands are transmitted to the various lights NL, SL, in order to make possible the central control of the lights NL, SL. The control commands are issued by a central control signal module 5 in the form of serial digital data words to the two data lines D1, D2.

For current supply of the lighting system there is provided a main distributor 1 for the common current supply, which on the input side is connected with the common current mains. On the output side this main distributor 1 issues a phase L for the mains current supply of the mains lights NL provided for normal operation, and a phase P for the a.c. voltage supply of the emergency current lights SL. N designates the neutral line, which is present everywhere in parallel to the phases L and P.

The phase P for the emergency current lights SL leads to the main distributor 3 for the safety current supply. In general it would be conceivable, for increasing reliability, that for the general current supply not only a single phase, but a plurality of phases carried in parallel, are issued from the main distributor 1, whereby then a phase selector switch 2 arranged in the main distributor 3 for the safety current supply always selects from amongst this plurality of phases that which in each case is still delivering current. If for example, a first phase has failed or is defective, a switching to a second or third phase which is still functional is then still possible. In the same manner, naturally, a plurality of phases can be passed to an intermediate (non-illustrated) sub-distributor for the general current supply.

The emergency current lights SL are connected to the two outputs of the main distributor 3 of the safety current supply. If, for example due to a defect of the main distributor 1 for the general current supply, or as a consequence of a total mains failure, the phase P (or all of the possible plurality of phases) no longer provides voltage, by means of a further selection switch 6 located in the main distributor 3 for the safety current supply a switching from the mains supply to a d.c. voltage supply can take place. The d.c. voltage source is thereby constituted by means of a rechargeable battery 7. In this manner it is ensured that the emergency current lights SL and their control devices are supplied with voltage at all times and are capable of operation.

Along with the mains lights NL, the control signal module 5 is also connected to the general current supply. With the control signals issued by the control signal module 5 onto the bus D1, D2 the various lights NL and SL can be controlled each individually or also simultaneously. In the simplest configuration, the digital data words include solely the commands ON, OFF and possibly EMERGENCY (for active switching over to emergency current operation). In more complex lighting systems it is however also possible to set with the aid of the control commands the level of illumination of each individual light, such as is known for example from EP 0 490 329 B1. The data words are detected and evaluated by the control devices in the lights NL, SL and transformed into appropriate control signals for operation of the lights NL, SL.

Additionally, in the present example, the control signal module 5 issues onto the bus also a monitoring signal corresponding to the condition of the general current supply. This monitoring signal is detected and evaluated in particular by the control devices of the emergency current lights SL. If thereby irregularities or faults are detected, this is considered as the appearance of a fault or emergency situation. The transmission of the monitoring signal is interrupted for example if the mains is disrupted—if for example it falls below a level of 85% of the normal power—or completely fails. The control devices then switch, due to the failure of this signal, self-actingly into an emergency current operation.

Since during the transmission of control commands the monitoring signal is temporally interrupted or absent, this must however be particularly characterized, in order to avoid an unintended activation of the emergency current operation. A few possibilities for this will be explained below.

For the reaction of the emergency current lights SL upon the appearance of a disruption situation a plurality of possibilities are conceivable. If purely emergency lights are for example involved, these are switched off during the normal operation of the lighting system, and switched on only after the recognition of a disruption situation. On the other hand, it could also be determined that the emergency current lights SL behave as the normal mains lights SL during a normal condition of the mains supply; that is, are likewise controlled through the control signals via the bus D1, D2 and thus initially cannot be distinguished from the mains lights NL. Only upon a mains failure or a disruption do the control devices switch over to the special emergency current operation and the emergency current lights SL are set to a certain emergency illumination level. If gas discharge lamps are involved, with the lighting system in accordance with the invention, there can thus be omitted a possible heating of the electrodes or new start of the lamps.

Thereby it is also quite conceivable that the individual emergency current lights SL behave differently. For example, some of them may be provided as purely emergency lights and switch on only for emergency current operation, whilst others are already previously switched on and merely change to a determined emergency illumination level. Preferably, however, all emergency current lights SL are operated during an emergency situation in a current saving mode, in order to use up the energy stored in the battery as slowly as possible in the case of a total mains failure, and to make possible an emergency current operation of long duration.

In FIG. 1 there is additionally illustrated an acoustic signaling device 4, which like the safety lights SL is connected to the safety current supply and likewise has a receiver unit for receiving the signals transferred on the data lines D1, D2. This acoustic signaling device likewise evaluates the monitoring signal corresponding to the condition of the mains and reacts thereto in the suitable manner; that is, for example upon the occurrence of an emergency condition, issues a warning sound or the like. Conceivable also is the provision of optical signaling devices such as for example flashing lights. Finally, there may also be provided a transmitting device which evaluates the monitoring signal, which in the case of a disruption sends an emergency call or a request for the initiation of maintenance work to an external central monitoring station.

If the bus lines D1, D2 are, alongside the transmission of the monitoring signal, simultaneously employed also for the transmission of signals for controlling the lights NL, SL it must be ensured—as mentioned above—that the temporary interruption of the monitoring signal does not lead to an unintended activation of emergency current operation. A preferred and very simple solution to this problem consists in that as monitoring signal there is issued onto the bus by the control signal module 5 a constant signal having a certain level, and that the level is temporarily reduced only for the transmission of control signals or of special data words. Thereby, this reduction is effected in accordance with a particular pattern or fulfils certain conditions which are recognized by the control devices of the emergency current lights SL. This will be explained in more detail with reference to FIGS. 2a and 2b.

Figure 2A:
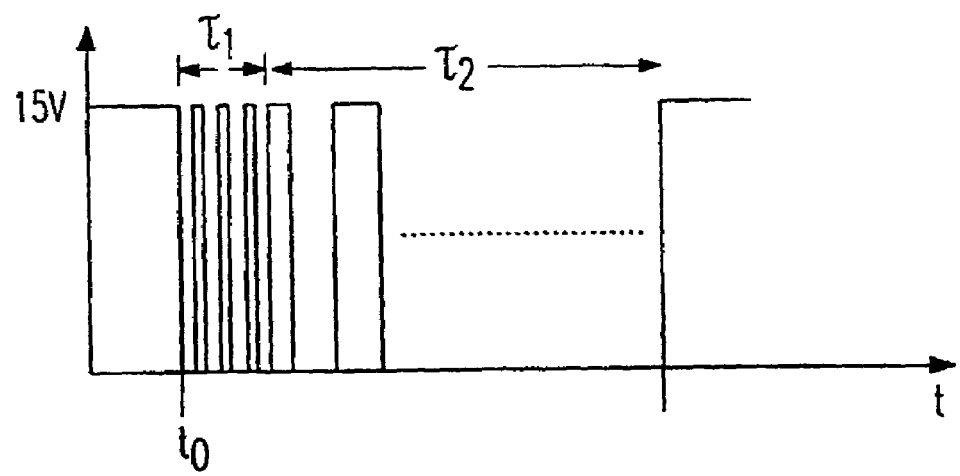
FIG. 2a is an example of a control signal characterized by a special signal pattern.

FIG. 2a shows the temporal development of a bus signal issued by the control signal module 5 from shortly before until shortly after the transmission of a control command. In this first example, the control command is characterized by means of a special signal pattern, as indication of a normal condition of the general current supply there is issued to a bus by the control signal module 5 a constant 15V-signal. This constant 15V-signal thus represents the monitoring signal. After the fall of the signal at time point $t_0$ there occurs during a time range $\tau_1$ the transmission of a special signal pattern which in the illustrated case consists of three consecutive pulses at temporally fixed spacings. By means of this pattern, all control devices are informed of the transmission of the control command or a temporary interruption of the 15V monitoring signal. Subsequently the control signal module 5 issues onto the bus, during the time period $\tau_2$, the actual control command, by means of which for example a new dimming level is set or some of the lights are switched on or switched off. After the transmission is ended, the level of the bus signal again climbs to a constant 15V and therewith indicates again the normal condition of the general current supply. It is conceivable to characterize or determine also the end of the transmission by means of a further signal pattern, in that the transmission of the control command may take up only a certain period of time. Of course, for characterizing a control command other signal patterns than three pulses can be employed.

Figure 2B:
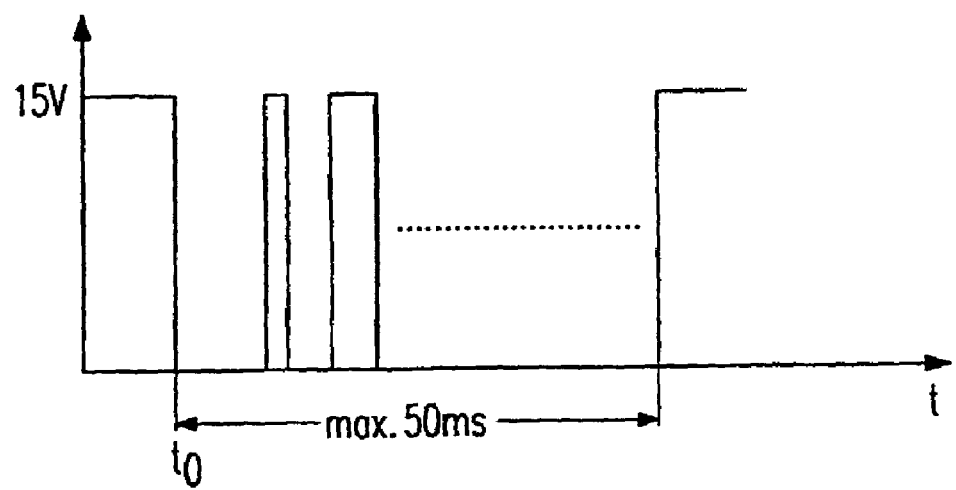
FIG. 2b is a further example of the characterization of the transmission of a control signal.

A further possibility, illustrated in FIG. 2b, for suppressing an unintended initiation of the emergency current operation, consists in that no special signal pattern is employed but it is determined that the reduction of the bus signal below a predetermined level of for example 15V may not exceed a certain period of time—for example 50 ms.

Alternatively to these two examples, the monitoring signal may not be issued to the bus on a permanent basis but only at certain time points and at regular intervals. The remaining time can then be exploited for the transmission of control signals. In this case, however, an irregular functioning of the control signal module 5, and thus an absence of the monitoring signal, would be taken by the control devices of the emergency current lights SL to be a fault situation.

The connection of the control signal module 5 to the general current supply is even to be considered as particularly advantageous, since in the case of a mains interruption or a disruption, the monitoring signal necessarily can no longer be transmitted and thus an emergency situation identification signal is passively issued. This process ensures, despite a technically slight outlay, thus a very reliable activation of the emergency lighting in the case of a disruption. A complex circuit, which specially monitors the condition of the general current supply, can thus be omitted. Thereby emergency operation is activated not only in the case of a current failure, but also in the case of a disruption of the bus or a defect of the control signal module 5.

Finally it is mentioned that in principle the control signal module 5 need not be provided for the monitoring of the current supply. For example, in the lighting system, separate monitoring modules may be provided, which assume this task and self-actingly issue the monitoring signal onto the bus. In this case, however, it must be ensured by means of suitable synchronization measures that the separate monitoring module and the control signal module 5 do not simultaneously issue signals onto the bus, or that the transmission of the monitoring signal is hindered by the control signal module 5. This problem cannot arise in the case when the control signal module 5 fulfils both tasks. The provision of a plurality of distributedly arranged monitoring modules, however, opens up the possibility to associate with each monitoring module its own monitoring signal and then in the case of a partial failure of the current supply to activate the emergency current lighting only in a certain region.

What is claimed is:

1. A lighting system comprising:
   at least one controllable first light connected to a first current supply;
   at least one controllable emergency current light, separate from said first light, and connected to an emergency current supply which is separate from said first current supply;
   control devices associated, respectively, with each said first light and with each said emergency current light, each of said control devices being connected to a common bus for the reception of control signals;
   a control signal module connected to said first current supply for monitoring current from said first current supply and for generating a monitoring signal corresponding to the monitored condition of said first current supply, said control signal module also being connected to said common bus for supplying said monitoring signal to said common bus for evaluation by at least one of said control devices, said at least one control device being constructed to activate said emergency current supply upon evaluation of a current supply disruption from said first current supply, wherein
   said control signal module is constructed and connected to supply additional control signals to said bus line for control and regulation of said first and said emergency current lights; and wherein
   said control device is constructed to recognize the transmission of said additional control signals in accordance with a predetermined characteristic thereof; and
   the control device of at least one of said emergency current lights also being constructed to effect an emergency current operation in response to interruption or failure of the monitoring signal, if the transmission of an additional control signal is not being effected.

2. A lighting system according to claim 1, wherein said control signal module is constructed to supply an additional control signal having a special signal pattern according to said predetermined characteristic onto said common bus.

3. A lighting system according to claim 1, wherein said predetermined characteristic of said additional control signal is transmitted within a predetermined interval of time.

4. A lighting system device according to claim 1, wherein said control signal module also supplies said monitoring signal to said common bus.

5. A lighting device according to claim 1, further including:
   a monitoring module separate from said control signal module, said monitoring module being constructed to monitor said first current supply and to supply said monitoring signal to said common bus.

6. A lighting system according to claim 1, wherein said control signal module is constructed to control operation of said emergency current lights in accordance with control signal supplied to said common bus, said control signal module also being constructed to recognize a disruption of said first current supply, and in response thereto, to operate a control device to set a predetermined illumination level.

* * * * *